United States Patent [19]

Brendel

[11] Patent Number: 5,775,211

[45] Date of Patent: Jul. 7, 1998

[54] ROLLER DRIVING PROCESS AND APPARATUS

[75] Inventor: Bernhard Brendel, Grefrarh, Germany

[73] Assignee: Eduard Kusters Maschinenfabrik GmbH & Co. KG, Krefeld, Germany

[21] Appl. No.: 776,180

[22] PCT Filed: Jul. 19, 1995

[86] PCT No.: PCT/DE95/00948

§ 371 Date: May 2, 1997

§ 102(e) Date: May 2, 1997

[87] PCT Pub. No.: WO96/03545

PCT Pub. Date: Feb. 8, 1996

[30] Foreign Application Priority Data

Jul. 22, 1994 [DE] Germany ............... 44 26 007.5
Nov. 11, 1994 [DE] Germany ............... 44 40 267.8

[51] Int. Cl.$^6$ .................................. D21G 1/02
[52] U.S. Cl. ............... 100/35; 100/47; 100/162 B; 100/170; 100/329; 100/334
[58] Field of Search ................ 100/38, 47, 329, 100/334, 162 B, 170, 35

[56] References Cited

U.S. PATENT DOCUMENTS

| | | | |
|---|---|---|---|
| 4,520,723 | 6/1985 | Pav et al. | 100/162 B |
| 4,625,637 | 12/1986 | Pav et al. | 100/47 |
| 4,729,153 | 3/1988 | Pav et al. | 100/170 |
| 4,813,349 | 3/1989 | Pav et al. | 100/162 B |
| 4,903,517 | 2/1990 | Van Haag et al. | 100/162 B |
| 4,936,207 | 6/1990 | Niskanen et al. | 100/47 |
| 5,152,041 | 10/1992 | Link et al. | 100/170 |
| 5,263,840 | 11/1993 | Heitmann et al. | 100/170 |
| 5,273,626 | 12/1993 | Niskanen et al. | 100/162 B |
| 5,438,920 | 8/1995 | Koivukunnas et al. | 100/38 |
| 5,533,443 | 7/1996 | Stotz et al. | 100/47 |

FOREIGN PATENT DOCUMENTS

| | | |
|---|---|---|
| 0 201 783 | 11/1986 | European Pat. Off. . |
| 0 315 567 | 5/1989 | European Pat. Off. . |
| 0 210 388 | 5/1990 | European Pat. Off. . |
| 23 25 721 | 4/1976 | Germany . |
| 33 25 385 | 11/1988 | Germany . |
| 38 20 974 | 4/1990 | Germany . |
| 42 02 373 | 4/1993 | Germany . |
| 42 03 497 | 8/1993 | Germany . |

OTHER PUBLICATIONS

*Das HYDREIN–Walzensystem*, Kleinewefers GmbH. Krefeld (received at German Patent Office in 1988).

*Primary Examiner*—Stephen F. Gerrity
*Attorney, Agent, or Firm*—Kenyon & Kenyon

[57] ABSTRACT

A roller has a rotary hollow cylinder through which extends a non-rotary crosshead. The hollow cylinder is supported on the crosshead by two opposite rows of hydrostatic supporting elements. When the roller is operated at particularly low linear pressures in the roll gap, a uniform linear force over the whole width of the paper web is exerted in the row of supporting elements opposite to the roll gap, causing an increase in the hydraulic pressures required in the row of supporting elements that faces the roll gap, until said pressures reach a range in which perfect operation of the supporting elements is ensured.

15 Claims, 3 Drawing Sheets

ROLLER DRIVING PROCESS AND APPARATUS

BACKGROUND OF THE INVENTION

The present invention relates to a process and apparatus for driving a roller with a rotary hollow cylinder that forms the working roller circumference, with a non-rotary crosshead that extends through the hollow cylinder lengthwise, leaving a radial distance from the inside cylindrical surface of the hollow cylinder all around, to which external forces can be transferred at the ends, with a first row of several hydrostatic supporting elements arranged on the crosshead and resting on it, closely following each other in its lengthwise direction, which can be controlled individually or in small groups of at most about three supporting elements, by means of which independent forces directed against the roller gap can be exerted against the inside cylindrical surface of the hollow cylinder, and with at least a second row of several hydrostatic supporting elements arranged on the crosshead and resting on it, following each other in its lengthwise direction, by means of which forces directed away from the roller gap can be exerted against the inside cylindrical surface of the hollow cylinder, with supply lines for hydraulic pressure fluid provided in or on the crosshead for each individual supporting element, and with a control device by means of which the pressures in the individual supply lines can be selected independently of one another.

Such rollers are disclosed, for example, in EP 210 388; rows of supporting elements act on the hollow cylinder toward different sides in the plane of effect of the roller, i.e., generally in the connecting plane of the roller (defined by the plane in which the axis of the roller connects with the axis of a counter-roller), so that variable force profiles can be exerted on the hollow cylinder over its length, and a desired, generally non-uniform linear force profile occurs in the roller gap. This linear force profile is dependent on the forces exerted by the individual supporting elements and the deformation properties of both the hollow cylinder and the product. For each individual case, the applied forces required to achieve a certain linear force profile can be calculated using known methods, such as the finite element method.

The supporting elements in known rollers interact with the crosshead as a piston and cylinder. Each supporting element has its own supply line and can therefore have pressure fluid applied to it independently of the other supporting elements. In each supporting element, the supply lines in the crosshead open into a pressure chamber assigned to the element, and the supplied pressure fluid presses the supporting element radially outward, so that it rests against the inside cylindrical surface of the hollow cylinder with a contact surface adapted to this inside cylindrical surface. Flat bearing pockets are formed in the contact surface, which are connected with the pressure chamber via throttle bores. The pressure fluid supplied to the pressure chamber exits into the bearing pockets via the throttle bores, and therein forms a hydrostatic pressure cushion, by which the supporting elements exert their force against the inside cylindrical surface of the hollow cylinder. The pressure fluid furthermore constantly flows outward, over the edge of the bearing pockets, and forms a liquid film in the edge regions of the bearing pockets. This prevents metal-to-metal contact between the supporting elements and the inside cylindrical surface of the hollow cylinder, and permits additional force to be transferred to the hollow cylinder.

In the aforementioned, known roller, the forces are transferred by means of the pressure fluid, which act in the supporting element, and the interstice between the crosshead and the inside cylindrical surface of the hollow cylinder is not involved in formation of the linear force, i.e., it makes no difference whether or not it is filled with pressure fluid.

However, the invention also has significance for rollers according to DE 38 20 974 C2. In such rollers, the interstice between the crosshead and the inside cylindrical surface of the hollow cylinder is not interrupted in the circumferential direction by lengthwise seals or similar devices, but rather entirely filled with pressure fluid under a controlled pressure. The individual supporting elements also receive pressure fluid under a controlled pressure, which can be slightly above or below the pressure in the surrounding interstice. If the pressure is above the pressure in the surrounding interstice, these supporting elements exert a corresponding positive force against the inside cylindrical surface of the hollow cylinder. However, if the pressure in the supporting elements is below the pressure in the interstice, the supporting element in question forms a zone that is separate from the otherwise uniform pressure in the interstice. Therefore, a lower force per cross-sectional unit is in effect here in comparison to the surrounding interstice. Such a supporting element therefore delimits a "hole" in the uniform pressure effect of the pressure fluid in the interstice and has approximately the same effect as a supporting element acting with a positive effect, at the pressure difference, if it were affixed on the diametrically opposite side of the crosshead.

The invention is also suitable for rollers of this type.

Finally, from EP 201 783 A2, the following is known: a roller with a rotary hollow cylinder which forms the working roller surface, with a non-rotary crosshead, which extends through the hollow cylinder lengthwise, leaving a radial distance from the inside cylindrical surface of the hollow cylinder all around, to which external forces can be transferred at the ends, with a first row of several hydrostatic supporting elements arranged on the crosshead and resting on it, closely following each other in its lengthwise direction, separately controlled in groups of up to about three supporting elements, by means of which independent forces directed against the roller gap formed between the roller and the counter-roller can be exerted against the inside cylindrical surface of the hollow cylinder, and with at least a second row of several hydrostatic supporting elements arranged on the crosshead and resting on it, following each other in its lengthwise direction, by means of which forces directed away from the roller gap can be exerted against the inside cylindrical surface of the hollow cylinder, with supply lines for hydraulic pressure fluid provided in the crosshead for each individual supporting element, and with a control device, by means of which the pressures in the individual supply lines can be selected independently of one another, where at least one group of several consecutive supporting elements of the second row is controlled in such a way that they produce a uniform counter-linear force over the expanse of the group, in the lengthwise direction of the roller.

In this connection, the two rows of supporting elements are referred to as the primary supporting elements, which work toward the roller gap, and the secondary supporting elements. The roller is heated, and heat is transferred to the hollow cylinder by the pressure fluid of the primary supporting elements. This causes the force exerted by a specific primary supporting element to deviate. This force deviation is compensated by a corresponding force deviation at the opposing secondary supporting element. Therefore, the purpose of this known roller is to maintain the linear force profile where changes in temperature exist.

In some paper treatments, particularly in the last stage of refining, only very low linear forces, in the range of only a few 10 N/cm of roller length, are desired. It is often difficult, in practice, to bring about such linear force progressions, because individual supporting elements are allowed to experience only very low pressures, and there might actually be the theoretical necessity to have "negative" hydraulic pressures in certain supporting elements. Experience has shown, however, that satisfactory operation of hydrostatically supported rollers of the type in question is possible only at hydraulic fluid pressures that are approximately 3 bar or higher.

The object of the invention is to exert particularly low linear forces for a roller of the type described.

SUMMARY OF THE INVENTION

This object is achieved by providing at least one group of several consecutive supporting elements of the second row is controlled in such a way that they produce a uniform counter-linear force over the expanse of the group, in the lengthwise direction of the roller, which requires an increase in the forces of the first row to produce a certain linear force distribution in the roller gap.

The present invention is based on the fact that the linear force exerted outwardly by the roller results from the difference of the forces exerted by the two rows of supporting elements. The hollow cylinder is "pulled away" from the roller gap by the supporting elements of the second row, at a uniform linear force. In order for the supporting elements directed toward the roller gap to produce the desired positive linear force—even a small one—they must have a correspondingly elevated pressure applied to them. Part of this pressure is used to compensate the forces of the supporting elements of the second row, which are directed away from the roller gap. The linear force that occurs in the roller gap results from the portions of the supporting elements of the first row, which are above the uniform linear forces directed away from the roller gap. By presetting a uniform linear force directed away from the roller gap, the operating pressure of the supporting elements directed toward the roller gap is artificially increased, specifically into a range that makes perfect operation of the supporting elements possible.

The supporting elements of the second row can be provided to be diametrically opposite the supporting elements of the first row, and present in the same formation and number. However, this is not compulsory. It is only necessary that the supporting elements of the second row produce a force distribution that is uniform and directed away from the roller gap. This means that there can be fewer supporting elements in a different arrangement than in the first row, as long as they produce a uniform force in the opposite direction.

The present invention is primarily practical in a case which involves low linear forces in the roller gap. If the required linear force profile in the roller gap is sufficiently high so that forces to be exerted by the individual supporting elements directed toward the roller gap demand sufficiently high hydraulic pressures in the supporting elements, enabling the supporting elements work perfectly, the artificial increases are no longer required and would only represent an unnecessary additional consumption of energy.

The basic effort of the invention is aimed at bringing about fine-tuning of the linear force distribution over the width of the web, without using previously known external aids, such as hot-air jets or inductive heating devices. The close spacing of the supporting elements, in combination with a sufficiently adaptable hollow cylinder and the structure of the present invention, results in sensitive adjustment of the linear force distribution down to very low linear force values.

The invention has already been described where the uniform linear force in the second row is present in only one length segment of the roller.

In many cases, however, it will be considered as a possibility to operate all the supporting elements of the second row at the same linear force, so that a constant counter-linear force per length unit is present over the entire length of the roller.

In the range of lower linear pressures it is particularly important, on the one hand, but also particularly difficult, on the other hand, to maintain a certain predetermined linear force progression along the roller gap.

In this range, deviations from the linear force progression by relatively small absolute force amounts already result in significant relative deviations and correspondingly high variations in the intended treatment effect along the roller gap. In other words, if the treatment of a paper web, for example, at low linear pressures, is to have the correct effect, it is important to accurately ensure the closest possible adherence to a predetermined linear force progression.

Adherence to a predetermined linear force progression is made more difficult because the deformation properties of the hollow cylinder and, in particular, the influence of the ends must be taken into consideration as interference factors. After all, the hollow cylinder is a finite tube segment, which undergoes a knife-edge load that terminates at a distance from the ends.

Inside the lengthwise expanse of the hollow cylinder, the latter experiences an oval cross-sectional deformation by means of the supporting elements of the two rows, which act in opposite directions, resulting in a certain internal linear force distribution. Towards the ends, however, the ovality decreases again, due to the absence of the supporting elements which act in the same way as on the inside, and naturally this has an effect on the linear force distribution at the ends. For rollers of the type in question, it is a characteristic that even to achieve a constant linear force progression with a web that is completely uniform across its width, a very non-uniform pressure distribution in the supporting elements located towards the roller ends is necessary. The pressures in the supporting elements at the ends must be clearly increased above a mean value present in the center region of the roller, and the pressures in the adjacent supporting inward elements must also be clearly lowered below this value, in order to achieve a uniform linear force distribution. This means that the inherent properties of the roller already require potential correction near the edge region.

In addition to the internal influences, i.e., those caused by the roller itself or by its limitation in the lengthwise direction, external influences can also exist in the edge region, and these must also be countered; they are mainly connected with the fact that in most cases, the web to be processed is not uniform over its width.

One of these influences is the temperature profile of the counter-roller, which is generally warmer at the edge because the paper web does not conduct off any heat than in inner regions.

In addition, the paper web is usually drier at the edge, which requires an adjustment of the treatment pressure in order to achieve a uniform treatment effect.

The paper web might have shrunk in the crosswise direction in the drying section of the paper machine, and this as well as the non-uniform temperature profile makes it necessary to adjust the pressure exerted.

Finally, profile problems of the headbox and the felts can also cause the need for corrections at the edge.

All of these influences must be balanced out by means of corrections at the edge of the roller, i.e., at the location where corrections are already necessary due to the roller itself, limiting the remaining correction capacity, so that not a lot of correction potential is left to take external effects into consideration. In this connection, cases can occur in which the roller can no longer correct itself, with its two rows of supporting elements.

A further object of the invention is to improve the correction possibilities at the edge for a roller of the type in question.

This task is accomplished where the linear force distribution in the roller gap is additionally corrected at at least one end of the roller. In this way, the linear force distribution in the roller gap is additionally corrected at at least one end of the roller, i.e., beyond the correction potential inherent in the roller with its two rows of supporting elements, which is acheived, in terms of apparatus, by means of additional devices to influence the linear force progression at the ends of the roller that are provided at the ends of the roller.

The instant invention cannot be viewed just from the aspect of aiding the roller, so to speak, if non-uniformity of the edge threatens to exhaust the correction potential of the roller itself. Instead, an important process of using the additional devices consists of balancing out the non-uniformity inherent in the roller right from the start, assuming that the web will subject it to uniform stress. The supporting elements will no longer have to exert greatly different forces at the edge, just in order to balance out the shape-related deformation characteristics of the hollow cylinder, but should rather be freed from this and be able to exert essentially the same forces over the width of the web. If non-uniformities occur at the edge during operation, thus creating a need for correction, the need can be met entirely by means of hydraulics, by suitable control of the supporting elements, which are no longer under stress due to the end correction of the hollow cylinder. Hydraulic correction by the supporting elements themselves can proceed relatively simply, and, in particular, without delay.

The additional devices can be implemented, in concrete manner, in at least three different ways, where the various characteristics can certainly also be present simultaneously in one roller.

In a first known apparatus of a roller with a corresponding structure, the uniform counter-linear force is provided only inside the lengthwise expanse of the roller, and two forces "directed backwards" are applied at the ends in the second row, independently of this force, in order to bring about a desired end correction, as it is actually known from DE-PS 23 25 721.

In the second known apparatus of this type, additional elements, which act against the inside cylindrical surface of the hollow cylinder are also provided; these are spreading elements acting on both sides of the plane of effect and exerting forces that act on the inside cylindrical surface of the end of the hollow cylinder perpendicular to the plane of effect; they pull the end of the hollow cylinder apart, so to speak, perpendicular to the plane of effect, causing the hollow cylinder to be pulled away in the roller gap, at the end of the roller gap.

The second known apparatus is disclosed in the company brochure of Kleinewefers GmbH "Das Hydrein-Walzsystem" [The Hydrein Roller System] and the corresponding DE 33 25 385 C2.

A third known apparatus for influencing the end of a roller according to the invention provides for additional means for thermal profiling of the end of the hollow cylinder, for example for heating, in order to bring about an increase in diameter and an increase of the linear force in the roller gap, or for cooling, for the opposite effect.

Preferably, the means can comprise a device for applying a fluid heat transfer medium only to the end region of the inside cylindrical surface of the hollow cylinder.

This third known apparatus is disclosed in EP 328 503.

BRIEF DESCRIPTION OF THE DRAWINGS

The drawings schematically shows exemplary embodiments of the invention.

DETAILED DESCRIPTION

Figure 1:
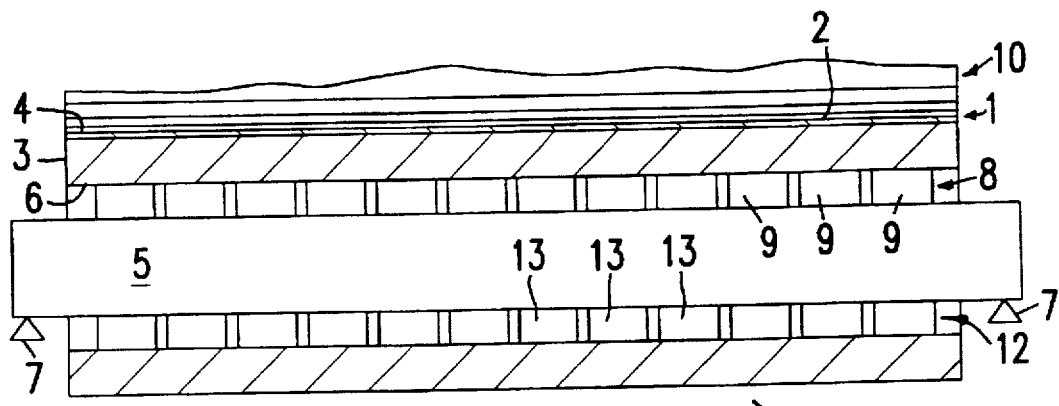
FIG. 1 shows the principle of the invention for a suitable roller, partially in longitudinal cross-section.
Figure 2:
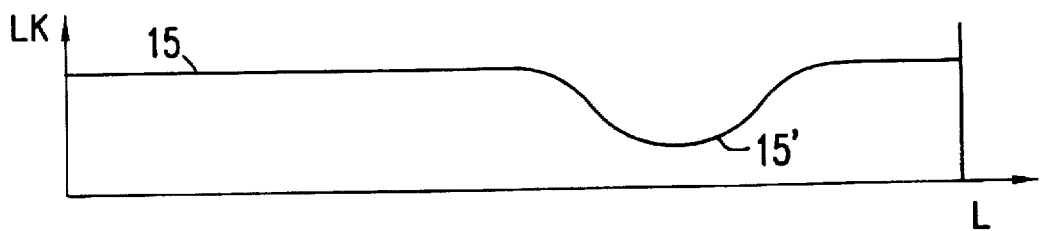
FIG. 2 shows an example of a desired linear force progression.

The roller indicated as a whole as 100 in FIG. 1 is the bottom roller of a pair of rollers and works together with a roller 10. The paper web 2 to be treated in the roller gap 1 is given a pressure treatment at low linear force, which has a certain profile 15 over the width of the paper web 2. This profile might result from non-uniformities of the paper web in the width direction and is shown in the curve of FIG. 2 that reproduces the progression of the linear force LK (force per centimeters of roller length) exerted in the roller gap 1 by the roller 100 (measured over the length of the roller 100 from its left end in FIG. 1). The non-uniformities can be, for example, non-uniform moisture, non-uniform gloss, etc., which are to be counteracted by the treatment. In the example, therefore, a reduction, i.e., a type of valley 15', is to be present in the linear force in the right half. However, it is understood that a uniform, relatively low linear pressure is also possible.

The roller 100 comprises a hollow cylinder 3 with a working cylinder surface 4 and a cylindrical, smooth inside surface 6, through which roller a crosshead 5 extends lengthwise and experiences external support forces 7 at its ends. The hollow cylinder 3 leaves a radial distance to the crosshead 5 all around. On the crosshead 5, a first row 8 of closely spaced supporting elements 9 is provided on the side facing the roller gap 1, to which pressure fluid can be supplied by means of supply lines in the crosshead (not shown) at different pressures per supporting element. However, small groups of supporting elements 9, for example edge groups of two or three supporting elements 9, can also be acted on in common.

Figure 7:
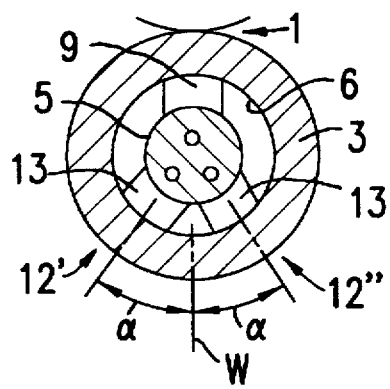
FIG. 7 shows a cross-section through a roller with two "second" rows of supporting elements.

Opposite the row 8, offset in the circumferential direction by 180° C., a second row 12 of supporting elements 13 is provided, extending over the entire length of the roller 100, which act away from the roller gap 1 and therefore attempt to pull the hollow cylinder 3 away from the counter-roller 10. Instead of the one row 12 of supporting elements 13, two rows 12' and 12" could also be provided, for example, where it is practical if supporting elements 13 assigned to each other and belonging to the rows 12, 12' and 12' are located in planes perpendicular to the axis and the resulting forces of the supporting elements 13 of the two rows 12' 12" are located in the plane of effect of the roller 100, i.e., opposite the force $K_9$ in each instance (FIG. 7).

The supporting elements 9, 13 are spaced closely in the rows 8, 12, along the roller 100, i.e., without avoidable gaps in their regions of effect, but without touching one another and usually have a width of about 150 to 300 mm (seen in the lengthwise direction of the roller 100) while the roller 100 can have a working width in the range of 5 to 10 m. Accordingly, about thirty and more supporting elements 9, 13 can be provided per row 8, 12. The representation in FIG. 1 is therefore not to scale. In general, the supporting elements 9 and 13 of each row 8, 12 have the same structure, relative to one another, and one supporting element 13 opposes the other supporting element 9, in each instance.

In FIG. 1, each of the supporting elements 9, 13 are diametrically opposite to each other in the plane of effect. In FIG. 7, however, it is indicated that the supporting elements 13 can also be arranged on both sides of the plane of effect, on the side facing away from the roller gap, in two rows 12' and 12", which form the same angle α relative to the plane of effect. In this configuration, the resultant forces of the individual supporting elements 13, 13, which are located in the same plane perpendicular to the axis of the roller, lie in the plane of effect but are opposed to the force of the supporting element 9 located in the same plane perpendicular to the axis.

To form the desired linear force profile 15 crosswise to the paper web 2, each of the supporting elements 9 can be controlled individually. The individual supporting elements 9 exert local forces in their length region, which act against the inside cylindrical surface 6 in the direction of the roller gap 1, and produce a linear force profile 15 in the roller gap 1 and on the working cylinder surface 4 of the hollow cylinder 3, where the rigidity of the hollow cylinder 3 plays a significant role in bringing about this profile. The forces to be exerted by the individual supporting elements 9 required to achieve the linear force profile 15 by no means have to be proportional to the linear force profile 15 in their progression along the length of the roller.

Figure 3:
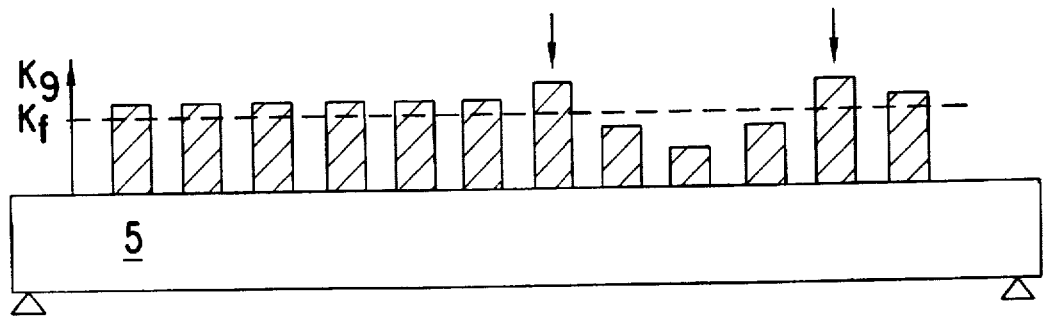
FIG. 3 and 4 show diagrams of the forces necessary in the individual supporting elements in order to achieve the linear force progression according to FIG. 2.

In FIG. 3, the forces $K_9$ exerted by the individual supporting elements 9 are shown that are necessary to produce the linear force profile 15 shown in FIG. 2 if the row 12 of the supporting elements 13 is not present or not in operation. In this case, the linear force profile 15 would be produced exclusively by the upper supporting elements 9. It turns out that on both sides of the linear force valley 15', an increase in the force exerted by the supporting elements 9 (indicated by the arrows) is necessary, while a reduction takes place in between. Only in this way can the linear force valley 15', which is sharply limited on the sides, be achieved.

Figure 4:
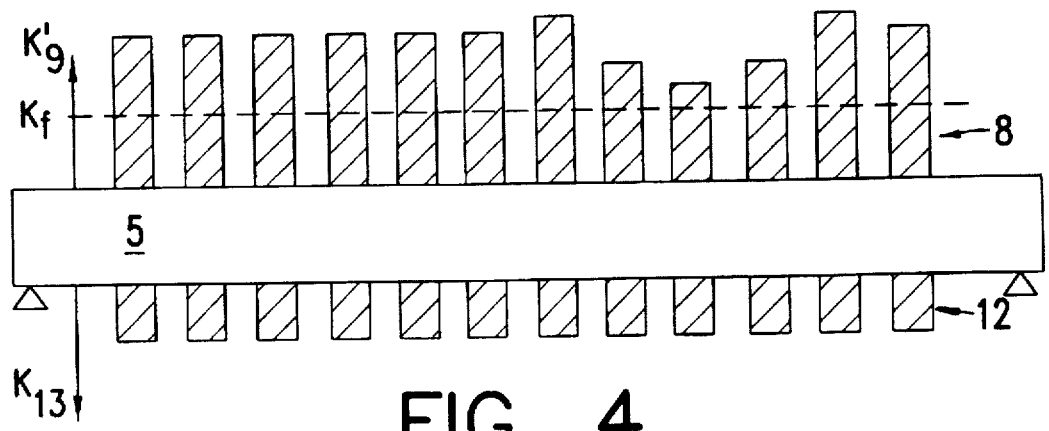

For perfect operation, the supporting elements 9 require a certain minimum hydraulic pressure on the order of about 3 bar, which is indicated as $K_p$ in FIG. 3 and 4. It turns out that the three supporting elements 9 located in the region of the linear force profile valley 15' would have to be operated at a pressure less than $K_p$ or in certain instances, would actually have to be negative. The desired linear force profile 15 could therefore not be produced with such an arrangement of supporting elements.

FIG. 4 shows an arrangement that corresponds to the roller 100 of FIG. 1 and in which the two rows 8, 12 with supporting elements 9, 13 offset by 180° C. in the circumferential direction are present; these exert forces $K_9$ upward, i.e., towards the roller gap 1, and forces $K_{13}$ downward.

The supporting elements 13 of the second row 12, facing away from the roller gap 1, are controlled in such a way that they all receive the same hydraulic pressure and produce a uniform counter-linear force over the length of the roller. If the linear force profile 15 is to be produced in the presence of such a counter-linear force, it is necessary to increase the hydraulic pressures prevailing in the individual supporting elements 9 of the first row 8, in order to have positive linear forces in the roller gap 1. In this way, the forces $K'_9$ and therefore the hydraulic operating pressures necessary in the individual supporting elements 9 to produce them are artificially shifted into a range in which all the forces $K'_9$ lie above $K_p$ and perfect operation of the supporting elements 9 is ensured.

In FIG. 1, which illustrates the principle, the row 12 of the uniformly controlled supporting elements 13 extends over the entire length of the roller 100.

Figure 5:
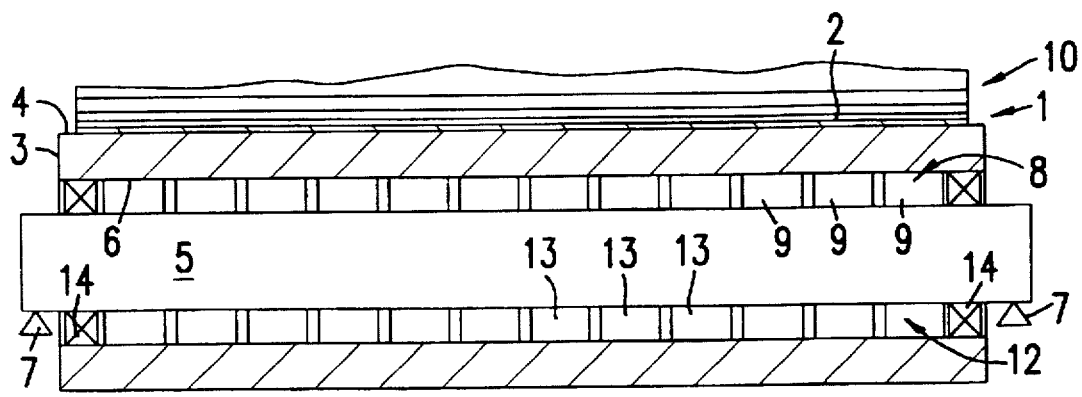
FIG. 5 and 6 show exemplary embodiments.

In concrete terms, such a structure is possible primarily for a roller 200 according to FIG. 5, in which the hollow cylinder 3 is mounted on the crosshead 5 on bearings 14 provided at both its ends.

Figure 6:
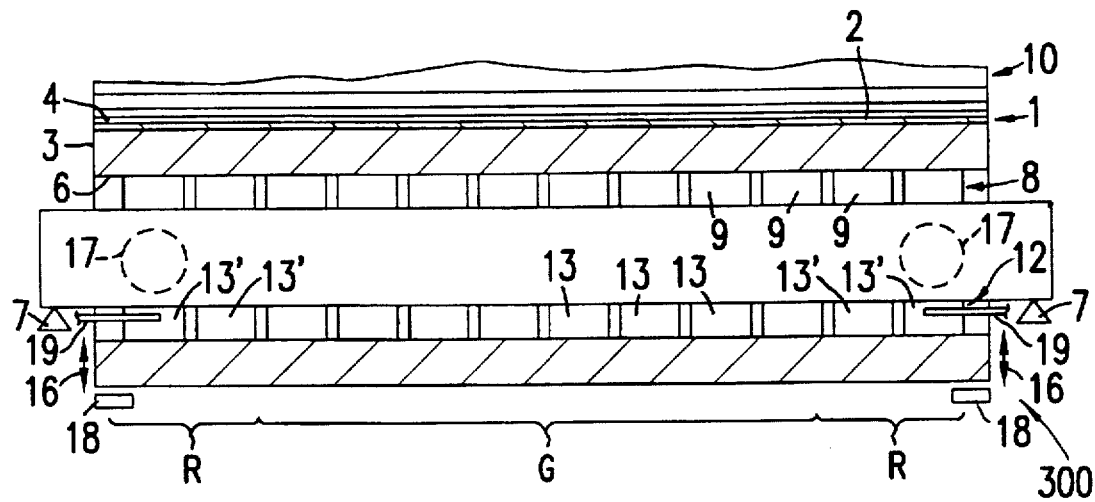

However, it is also possible to control only a group G of several consecutive supporting elements 13 of the second row 12 uniformly, as is reproduced for the roller 300 of FIG. 6. The roller 300 is one with an internal stroke, with no bearings that are comparable to the bearings 14 of FIG. 5 being provided at its ends. The hollow cylinder 3 can be moved in suitable guide devices (not shown) in the plane of effect, i.e., parallel to the plane of the drawing, crosswise to the crosshead 5, in the direction of the arrows 16. Here in this example, small groups R of two supporting elements 13' are provided in the second row 12, at the ends, which are not part of the uniformly controlled group G, but instead are controlled independently of this group, in order to produce forces that act backwards, i.e., directed away from the roller gap 1. Such a measure can become necessary in order to pull the hollow cylinder away from the roller gap 1 at its ends and to avoid excessive edge pressure on the paper web 2 there, if necessary.

Figure 8:
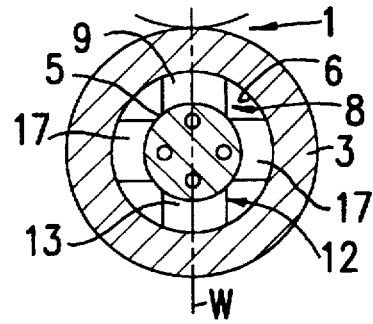
FIG. 8 shows a cross-section through a roller with spreading elements acting in the crosswise direction.

FIG. 6 shows another possibility for an additional influence on the end region of the hollow cylinder 3. This involves additional spreader elements 17, which act in the crosswise direction; their arrangement is evident from FIG. 8, and they act just like the supporting elements 9, 13, only in a direction of effect rotated by 90° C. in the circumferential direction. It is true that the ovality of the hollow cylinder 3 produced by the supporting elements 9, 13 decreases towards the end, so that the cross-section of the hollow cylinder 3 comes closer to a circular shape again by itself. However, the accompanying decrease of the linear force in the roller gap 1 can be supported further by the spreader elements 17. The spreader elements do not necessarily have to be arranged in a perpendicular plane W (i.e., perpendicular relative to the plane of effect) as shown in FIG. 8. If the angles α of the embodiment according to FIG.

7 are selected to be larger than shown, a certain spreading effect also results, if a counter-force acting away from the roller gap 1 is applied at the same time.

FIG. 6 also indicates possibilities for a thermal influence on the ends of the hollow cylinder. For example, inductive coils 18 could be arranged at the ends, just outside the hollow cylinder 3. Alternatively, the thermal profiling could also take place internally, which is represented by the spray device 19. The effect of the heat carrier medium sprayed against the inside cylindrical surface 6 of the hollow cylinder 3 from the inside is limited to the end region of the hollow cylinder 3, and gives it a different temperature with a corresponding deviation from the cylindricity and an influence on the linear force progression at the end.

Figure 9A:
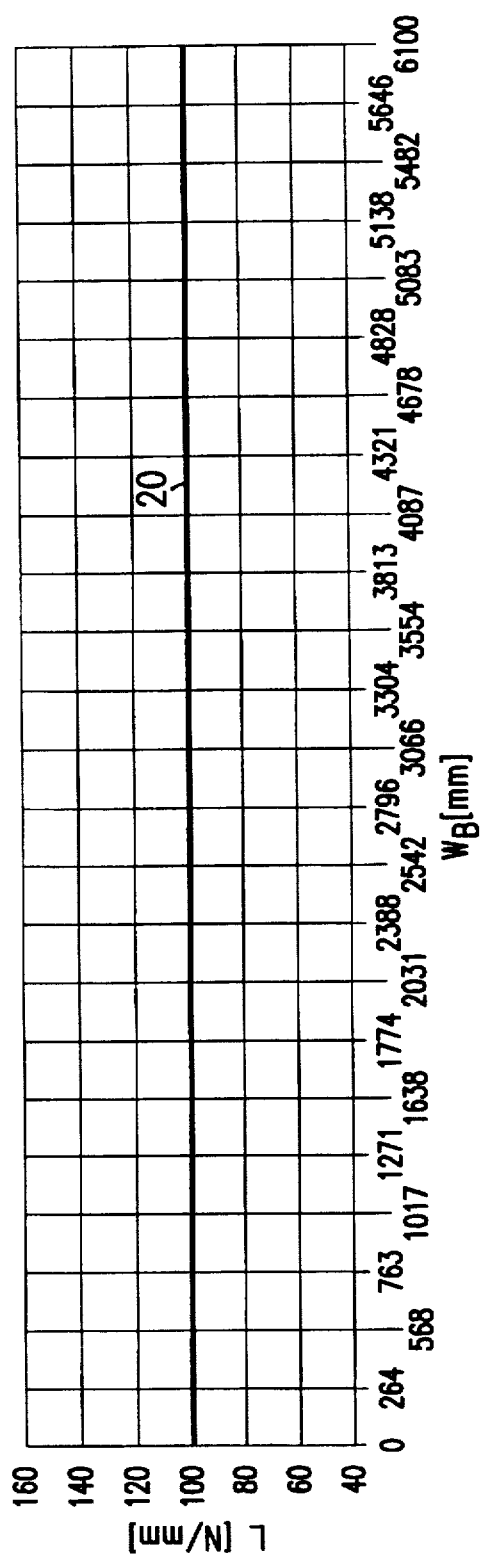
FIGS. 9A and 9B show two related diagrams which illustrate the pressure distribution in the first row of supporting elements which is necessary to achieve a uniform linear force progression.
Figure 9B:
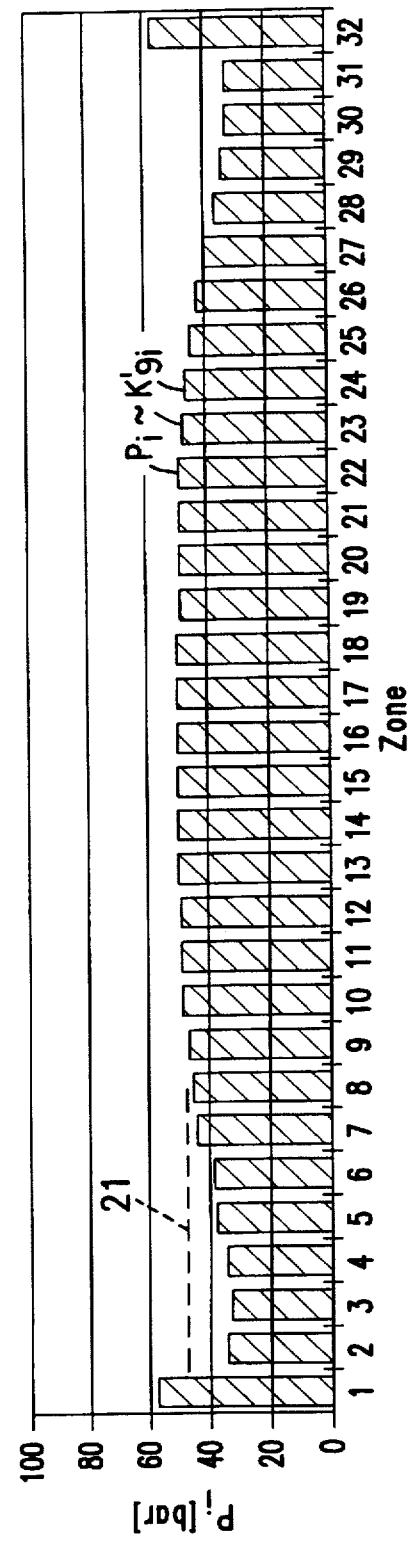

FIG. 9A and FIG. 9B serve as a detailed explanation of the special significance of the additional measures described in connection with FIGS. 6 to 8 to influence the linear force profile at the ends of the roller 100. FIGS. 3 and 4 are highly schematic in this respect, and are only intended to illustrate the principle. FIG. 9A, however, is based on an actual calculation of the hydraulic pressures necessary in the individual supporting elements 9. Let us assume that the web to be treated has uniform properties over its width $W_B$ and extends over the length of the roller 100. An effort is made to exert a linear force L of 100 N/mm of product length on this web, uniformly distributed over its width, as indicated by the horizontal line 20. The roller 100 of this example has thirty-two supporting elements 9. The force exerted by each individual supporting element $9_i$ is proportional to the hydraulic pressure $p_i$ which prevails in it (i =1 . . . 32). The diagram in the bottom part of FIG. 9 clearly shows that the distribution of the pressures $p_i$, i.e., the individual forces exerted by the corresponding supporting elements $9_i$, which are required for a constant progression of the linear force L in the roller gap 1 is far from constant at the ends of the roller 100. The supporting elements $9_1$, and $9_{32}$, which are located at the ends, must receive pressures and exert forces that are significantly above the mean value present in the region of the center supporting elements $9_{13}$ to $9_{20}$. The supporting elements $9_2$ to $9_6$ and $9_{28}$ to $9_{31}$, which are inwardly adjacent to the end supporting elements $9_1$ and $9_{32}$, on the other hand, must bring about forces which are significantly below the mean value indicated.

The great non-uniformity of the required exertion of force by the supporting elements near the edge region is inherently due to the properties of the roller 100 itself. If external influences are added to this, and the web is not uniform over the entire length of the roller 100, as was assumed above, additional corrections might be necessary at the edge, i.e., the supporting elements $9_1$ and $9_{32}$ might have to exert even higher forces and the adjacent supporting elements might have to exert even lower forces. In this regard, the roller 100 can encounter technical limits, if it works only with the supporting element rows 8 and 12.

In these cases, additional correction devices relating to FIG. 6 to 8 are significant. However, the correction devices can also be used in such a way that they serve to make the forces K'$g_i$ demanded from the individual supporting elements 9 uniform; their non-uniform distribution, as it is required for roller correction, i.e., to balance out the deformation properties of the hollow cylinder 3, is shown in FIG. 9B. The correction devices therefore influence the roller 100, without taking into consideration any non-uniformities, in such a way that the supporting elements 9 can produce an essentially uniform force even at the edge, which guarantees uniformity of the linear force in the roller gap. The uniform force distribution is indicated with the broken line 21.

If the web then has non-uniformities at the edge, the supporting elements located there still have their correction potential available, and the web correction can take place by means of these supporting elements 9, i.e., without the additional correction devices having to be used for this purpose.

What is claimed is:

1. In a system for driving a roller including
   a first roller having a rotating hollow cylinder and a lengthwise end, the hollow cylinder further including a working cylindrical surface and an inside cylindrical surface,
   a second roller with a roller gap disposed between the first roller and the second roller,
   a non-rotating crosshead, extending lengthwise through the hollow cylinder, radially spaced from the inside cylindrical surface, and receiving external support at the lengthwise ends of the crosshead,
   a first row of a plurality of hydrostatic supporting elements, each of the plurality of hydrostatic elements coupled to the crosshead and adjacently disposed to each other in the lengthwise direction of the first row, wherein each of the plurality of supporting elements of the first row are controlled in groups of approximately no more than three supporting elements to produce independent forces that are directed toward the roller gap and exerted against the inside cylindrical surface,
   a second row of a plurality of hydrostatic supporting elements, the second row having a subgroup of a plurality of adjacent supporting elements, each of the plurality of hydrostatic elements of the second row coupled to the crosshead and adjacently disposed to each other in the lengthwise direction, wherein the second row of hydrostatic supporting elements are controlled to produce forces directed away from the roller gap that are exerted against the inside cylindrical surface,
   a plurality of hydraulic fluid supply lines disposed in or on the crosshead, and
   a device for independently controlling each of the plurality of hydraulic fluid supply lines,
   a process for driving the roller comprising the step of:
   controlling the pressure in the subgroup of the second row to produce a uniform counter-linear force in each of the supporting elements of the subgroup, wherein forces in the supporting elements of the first row and the forces in the supporting elements of the subgroup are above the minimum force corresponding to the minimum pressure necessary for ideal operation of the supporting elements.

2. The process according to claim 1, wherein the linear force distribution in the roller gap is corrected at the lengthwise end of the first roller.

3. A apparatus for driving a roller comprising:
   a first roller having a rotating hollow cylinder and a lengthwise end, the hollow cylinder further including a working cylindrical surface and an inside cylindrical surface,
   a second roller with a roller gap disposed between said first roller and said second roller,
   a non-rotating crosshead, extending lengthwise through the hollow cylinder, radially spaced from the inside cylindrical surface, and receiving external support at the lengthwise ends of said crosshead,
   a first row of a plurality of hydrostatic supporting elements, each of the plurality of hydrostatic elements coupled to the crosshead and adjacently disposed to each other in the lengthwise direction of the first row, wherein each of the plurality of supporting elements of the first row are controlled in groups of approximately no more than three supporting elements to produce independent forces that are directed toward the roller gap and exerted against the inside cylindrical surface, a second row of a plurality of hydrostatic supporting elements, the second row having a subgroup of a plurality of adjacent supporting elements, each of the plurality of hydrostatic elements coupled to the crosshead and adjacently disposed to each other in the lengthwise direction, wherein the second row of hydrostatic support elements are controlled to produce forces directed away from the roller gap that are exerted against the inside cylindrical surface, a plurality pf hydraulic fluid supply lines disposed in or on the crosshead, and a device for independently controlling each of the plurality of hydraulic fluid supply lines, wherein the device controls the pressure in the subgroup of the second row to produce a uniform counter-linear force in each of the supporting elements of the subgroup, and forces in the supporting elements of the first row and the forces in the supporting elements of the subgroup are above the minimum force corresponding to the minimum pressure necessary for ideal operation of the supporting elements.

4. A apparatus according to claim 3, further comprising additional devices for influencing the linear force progression near the ends of the first roller, said additional devices being disposed near the ends of the first roller.

5. A apparatus according to claim 4, wherein the plurality of supporting elements of said second row includes a first portion of supporting elements near the ends of said second row and a second portion, said first portion being controlled independently of the second portion.

6. The apparatus according to claim 5, further comprising spreading elements which act towards both sides of the plane of effect are provided at the ends of the roller, which exert forces which act on the inside circumference of the ends of the hollow cylinder, crosswise to the plane of effect.

7. The apparatus according to claim 6, wherein means for thermal profiling of the end of the hollow cylinder are provided at the ends of the roller.

8. The apparatus according to claim 7, wherein the means for thermal profiling comprise a device for applying internally a fluid heat carrier medium only to the end region of the inside circumference of the hollow cylinder.

9. The apparatus according to claim 5, wherein means for thermal profiling of the end of the hollow cylinder are provided at the ends of the roller.

10. The apparatus according to claim 9, wherein the means for thermal profiling comprise a device for applying internally a fluid heat carrier medium only to the end region of the inside circumference of the hollow cylinder.

11. The apparatus according to claim 4, further comprising spreading elements disposed at the ends of the first roller, said spreading elements exerting forces on the inside cylindrical surface near the ends of the first roller in a direction substantially perpendicular to the plane of effect.

12. The apparatus according to claim 11, wherein means for thermal profiling of the end of the hollow cylinder are provided at the ends of the roller.

13. The apparatus according to claim 12, wherein the means for thermal profiling comprise a device for applying internally a fluid heat carrier medium only to the end region of the inside circumference of the hollow cylinder.

14. The apparatus according to claim 4, wherein means for thermal profiling of the end of the hollow cylinder are provided at the ends of the roller.

15. The apparatus according to claim 14 wherein the means for thermal profiling comprise a device for applying internally a fluid heat carrier medium only to the end region of the inside circumference of the hollow cylinder.

* * * * *

UNITED STATES PATENT AND TRADEMARK OFFICE
CERTIFICATE OF CORRECTION

PATENT NO. : 5,775,211
DATED : July 7, 1998
INVENTOR(S) : Bernhard Brendel

It is certified that error appears in the above-identified patent and that said Letters Patent is hereby corrected as shown below:

Column 7, line 5, change "180°C" to --180°--;

Column 7, line 11, change "and 12'" to --and 12"--;

Column 8, line 8, change "180°C" to --180°--;

Column 8, line 57, change "90°C" to --90°--;

Signed and Sealed this

Thirteenth Day of July, 1999

Attest:

Attesting Officer

Q. TODD DICKINSON

Acting Commissioner of Patents and Trademarks